(12) United States Patent
Zuckschwerdt et al.

(10) Patent No.: US 10,031,509 B2
(45) Date of Patent: Jul. 24, 2018

(54) PROCESS FOR MONITORING AT LEAST ONE MACHINE TOOL

(71) Applicant: Schwäbische Werkzeugmaschinen GmbH, Schramberg-Waldmössingen (DE)

(72) Inventors: Johannes Zuckschwerdt, St. Georgen im Schwarzwald (DE); Peter Siegel, Sulz-Bergfelden (DE); Andreas Tanneberger, Böblingen (DE)

(73) Assignee: SCHWABISCHE WERKZEUGMASCHINEN GMBH, Schramberg-Waldmossingen (DE)

( * ) Notice: Subject to any disclaimer, the term of this patent is extended or adjusted under 35 U.S.C. 154(b) by 433 days.

(21) Appl. No.: 13/965,389

(22) Filed: Aug. 13, 2013

(65) Prior Publication Data

US 2014/0309761 A1    Oct. 16, 2014

(30) Foreign Application Priority Data

Apr. 15, 2013    (DE) .................. 10 2013 103 779
Apr. 15, 2013    (EP) .................... 13163801

(51) Int. Cl.
    *G05B 19/406*    (2006.01)
(52) U.S. Cl.
    CPC .. *G05B 19/406* (2013.01); *G05B 2219/50185* (2013.01); *G05B 2219/50197* (2013.01)
(58) Field of Classification Search
    CPC .... G05B 19/41875; G05B 2219/45031; G05B 19/406; G05B 2219/50185; G05B 2219/50197; G06Q 10/06

(Continued)

(56) References Cited

U.S. PATENT DOCUMENTS 4,471,444 A * 9/1984 Yee ................... B23Q 17/0947
                                                   700/175
4,827,115 A * 5/1989 Uchida .............. G06K 19/0723
                                                   235/380

(Continued)

FOREIGN PATENT DOCUMENTS

DE    101 44 788 A1    4/2003
DE    101 52 765 A1    5/2003

(Continued)

OTHER PUBLICATIONS

Canadian Notice of Allowance dated Feb. 15, 2017, for CA 2,847,923.

*Primary Examiner* — Robert E Fennema
*Assistant Examiner* — Jigneshkumar C Patel
(74) *Attorney, Agent, or Firm* — Bacon & Thomas, PLLC

(57) ABSTRACT

A device, system, method, business method, and process of monitoring at least one machine tool including: determining a target signal of a component of the machine tool when performing a work step on the basis of at least one pre-definable or predefined reference number; detecting a current signal of the component of the machine tool when performing the work step; detecting a deviation of the target signal from the current signal; and generating a deviation signal. The deviation signal includes a piece of information about the component, the machine tool, and/or the deviation. The device, system, method, business method, and process of monitoring at least one machine tool further includes transferring the deviation signal as a new data set to an externally accessible storage unit that is separate or separable from the machine tool.

14 Claims, 2 Drawing Sheets

(58) Field of Classification Search
USPC .......................................................... 700/108
See application file for complete search history.

(56) References Cited

U.S. PATENT DOCUMENTS

| | | | | |
|---|---|---|---|---|
| 2002/0133816 | A1* | 9/2002 | Greene | .................. H04H 60/37 |
| | | | | 725/13 |
| 2008/0091295 | A1* | 4/2008 | Corey | .............. G05B 19/40937 |
| | | | | 700/178 |
| 2009/0030545 | A1* | 1/2009 | Masuya | .................. B23Q 17/12 |
| | | | | 700/175 |
| 2011/0133940 | A1* | 6/2011 | Margalit | ............. E06B 3/66366 |
| | | | | 340/584 |
| 2013/0036198 | A1* | 2/2013 | Galm | .................. B41F 33/0009 |
| | | | | 709/217 |

FOREIGN PATENT DOCUMENTS

| | | |
|---|---|---|
| DE | 10 2009 024101 A1 | 10/2010 |
| EP | 1 513 036 A2 | 3/2005 |
| WO | 2010/118863 A1 | 10/2010 |

\* cited by examiner

PROCESS FOR MONITORING AT LEAST ONE MACHINE TOOL

CROSS REFERENCE TO RELATED APPLICATION

This application claims priority to European Application No. EP13163801 filed on Apr. 15, 2013, and German Patent Application DE102013103779, filed on Apr. 15, 2013. The entire contents of these applications are incorporated herein by reference.

FIELD OF THE INVENTION

The embodiments of the present invention relate to a device, system, method, business method, and process for monitoring at least one machine tool.

BACKGROUND OF THE INVENTION

Machine tools, storage units as well as processes for monitoring at least one machine tool are known. In this context, the work step of a component of a machine tool, for instance, of a tool, is monitored. For this purpose, a target signal is allocated to the component of the machine tool when performing a work step which is based on at least one stored reference number. If a detected current signal of the machine tool component deviates from the target signal when performing the work step, the operator of the machine tool receives a respective indication directly displayed on the machine tool as to which component is working in deviation and of which type the deviation is.

Moreover, it is known to remotely maintain machine tools by means of a remote access, in which context the remote maintenance is carried out by a concrete inquiry and clearance of the access to the machine tool.

In this context, it has turned out to be disadvantageous that a deviation of the current signal of the machine tool component from the target signal of the machine tool component is detectable only directly on the machine tool. Thus, it may never be completely excluded that a warning message of the machine tool is misinterpreted or ignored by the operating personnel which can increase the risk of damage to the machine tool or which may lead to a quality reduction of the work pieces.

It is an objective of the embodiments of the present invention to improve a process described above so that the operation of a machine tool, in particular production of work pieces, is optimized.

SUMMARY OF THE INVENTION

The embodiments of the present invention include a process for monitoring at least one machine tool, including the steps of:
  a) determination of at least one target signal of at least one component of the machine tool when performing a work step on the basis of at least one pre-definable or predefined reference number;
  b) detection of a current signal of the at least one component of the machine tool when performing the work step;
  c) detection of a deviation of the target signal from the current signal and generation of a deviation signal, including at least one piece of information about the component, the machine tool and/or the deviation.

Moreover, the embodiments of the present invention include a machine tool operable with the above procedure as well as a storage unit for storing and retrieving data sets interacting with the machine tool and/or operable with the process.

The embodiments of the present invention include a method of monitoring at least one machine tool including: determining a target signal of a component of the machine tool when performing a work step on the basis of at least one pre-definable or predefined reference number; detecting a current signal of the component of the machine tool when performing the work step; detecting a deviation of the target signal from the current signal; and generating a deviation signal. The deviation signal includes a piece of information about the component, the machine tool, and/or the deviation. The device, system, method, business method, and process of monitoring at least one machine tool further includes transferring the deviation signal as a new data set to an externally accessible storage unit that is separate or separable from the machine tool.

Yet another embodiment of the present invention is directed to a device for monitoring at least one machine tool including: an externally accessible storage unit that is separate or separable from the machine tool, where the externally accessible storage unit stores and retrieves data sets. The device further includes a pre-definable or predefined reference number, a target signal, and a current signal, where the reference number, target signal, and current signal include conditions relevant to an operation or process of the machine tool. Additionally, the device includes a sensor on the machine tool, a deviation of the target signal from the current signal, and a deviation signal, where the deviation signal includes at least one piece of information about the machine tool or the deviation. Further, the device includes a new data set including the deviation signal, and a data processing unit.

The embodiments of the present invention further include a system for monitoring at least one machine tool including at least one machine tool and a device for monitoring the at least one machine tool. The device includes a pre-definable or predefined reference number, a target signal, and a current signal, where the reference number, target signal, and current signal include conditions relevant to an operation or process of the machine tool. The device further includes a sensor on the machine tool, a deviation of the target signal from the current signal, and a deviation signal, where the deviation signal includes at least one piece of information about the machine tool or the deviation. Additionally, the device includes a new data set including the deviation signal, and a data processing unit. The system further includes an externally accessible storage unit that is separate or separable from the machine tool, where the externally accessible storage unit stores and retrieves data sets.

Yet another embodiment of the present invention is directed to a method of monitoring at least one machine tool including: determining at least one target signal of at least one component of the machine tool when performing a work step on the basis of at least one pre-definable or predefined reference number; detecting a current signal of the at least one component of the machine tool when performing the work step; detecting a deviation of the target signal from the current signal; and generating a deviation signal, where the deviation signal includes at least one piece of information about the component, the machine tool, and/or the deviation. The method further includes monitoring the machine tool deviation signal beyond operating personnel of the machine tool in order to correct or repair the machine tool prior to a failure of the machine tool.

BRIEF DESCRIPTION OF THE DRAWINGS

Preferred features of the embodiments of the present invention are disclosed in the accompanying drawings, wherein similar reference characters denote similar elements throughout the several views, and wherein.

DETAILED DESCRIPTION OF THE INVENTION

Figure 1:
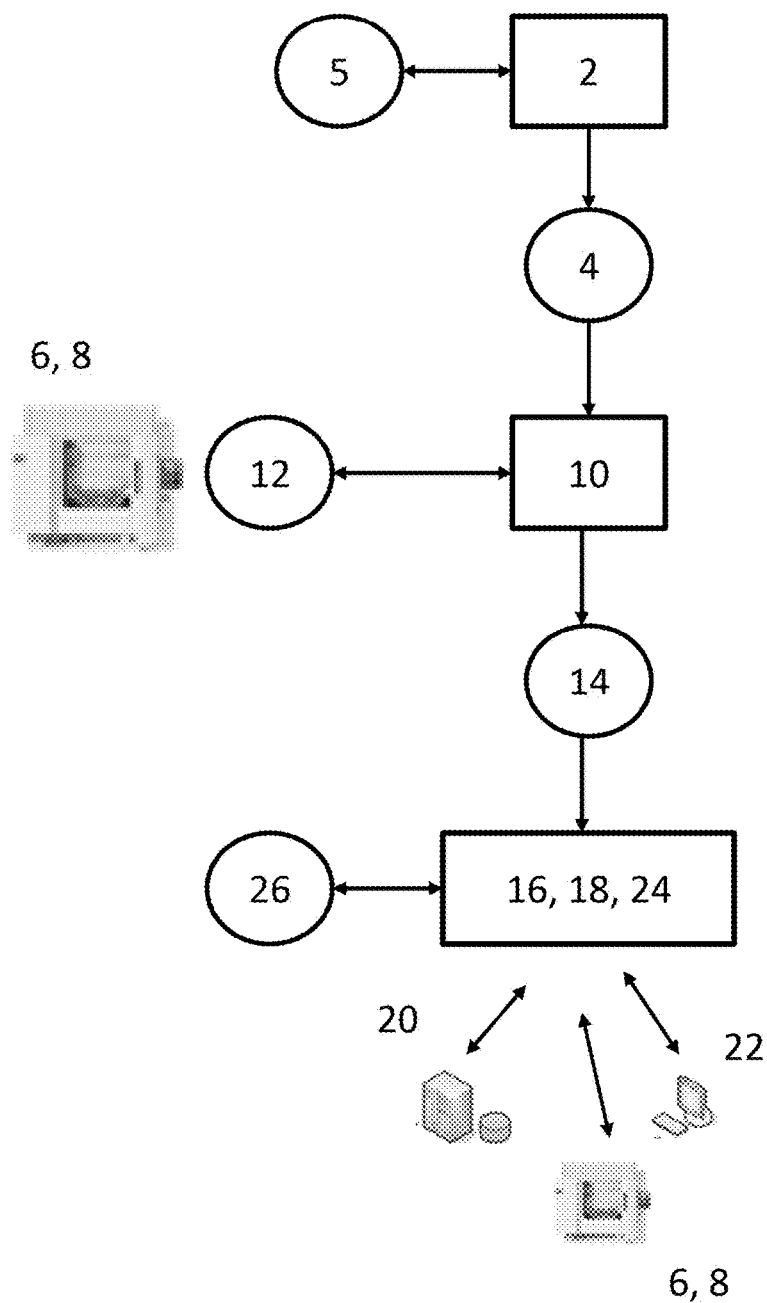
FIG. 1 shows a schematic process chart of the process according to an embodiment of the present invention.

The embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will convey the scope of the invention to those skilled in the art.

In the following description, like reference characters designate like or corresponding parts throughout the figures.

According to the embodiments of the present invention, the task of the process specified in the beginning is solved by transferring and/or storing the deviation signal as a new data set to/on an externally accessible storage unit which is separate or separable from the machine tool.

The pre-definable or predefined reference number, the target signal and/or the current signal may principally include all conditions relevant to an operation or process of the machine tool component. It may, for example, include a travel path, speed and/or acceleration along at least one dimension. Moreover, it is imaginable that the pre-definable or predefined reference number includes at least one performance parameter such as the amperage, hydraulic and/or pneumatic pressure, speed, time, duration, voltage, and/or power or torque of the machine tool component.

The machine tool component may, for instance, be a tool, such as a turning tool, milling tool, drilling tool, honing or grinding tool, eroder or the like. In addition, the component may also comprise a pump, a generator and/or an electric, mechanical, pneumatic and/or hydraulic engine.

The current signal can principally be detected arbitrarily. It has turned out to be simple and practical if the current signal is detected by at least one sensor of the machine tool. The sensor can comprise a tactile sensor, a motion sensor, an acceleration sensor, a distance sensor, a pressure sensor, a fluid sensor, and/or a temperature sensor or the like.

Moreover, it is imaginable that the current signal is composed of information from different sensors.

The fact that the deviation signal is transferred as a new data set by and storable in an externally accessible storage unit which is separate and separable from the machine tool, allows external access to the storage unit and to detect and display the deviation signal. Thus, it is possible that the machine tool may be monitored beyond the operating personnel which allows detection of a deviation of the current signal from the target signal in due time. In such case, a correction and/or repair can be carried out at an early stage, in particular, prior to a failure of the component and/or the machine tool.

Furthermore, several machine tools can be monitored more easily together which makes the deployment of personnel more efficient.

In addition, standstills of the machine tool may be reduced and thus the efficiency of the machine tool operation is increased.

In principal, it is imaginable that only the new data set is stored in the storage unit in order to be visible from a distance from the machine tool.

However, it has turned out to be practical if the process also includes a verification of whether an old data set corresponding to the new data set is stored in the storage unit and/or if it includes a retrieval of an old data set stored in the storage unit and corresponding to the new data set and/or an allocation or storage of the new data set in the old data set.

Thus, it is retraceable whether the detected deviation has occurred for the first time and/or once and/or whether there is a systematic deviation of the current signal from the target signal. This facilitates an interpretation of the deviation signal.

In principle, it is imaginable that the verification of whether there is an old data set and/or that the retrieval of the old data set is affected via the storage unit by the machine tool. However, when further developing this embodiment of the present invention, it has turned out to be advantageous if the verification of whether there is an old data set and/or if the retrieval of the old data set via the storage unit are carried out by a further storage unit independent from the storage unit and/or by a data processing unit.

If the retrieval of the old data set by the storage unit is carried out by a data processing unit, the new data set and the old data set may be analyzed without problems. In addition this allows the system to analyze old data sets and new data sets of different storage units by one and the same processing unit. This allows detection of a system-related deviation of the machine tool in different locations. In addition, the detection of the current signal may be carried out continuously or in periodic intervals.

If the current signal is detected continuously, the sensitivity of the process is increased. If the current signal is detected in periodic intervals, the calculation times and the energy demand may be reduced.

It is principally imaginable that the deviation via a manual retrieval is, for instance, caused by the data processing unit. In order to facilitate the monitoring of the at least one machine tool, it has turned out to be advantageous if at least the deviation of the target signal and current signal is displayed if:

a) the deviation signal and/or the new data set satisfies a defined or definable display requirement, in particular, storable or stored in the machine tool and/or the storage unit; and/or b) a predefined or pre-definable number of old data sets, in particular stored in the storage unit, is reached or exceeded.

The display requirement may, for example, be of such nature that it includes a damage to the component or a defective operation of the at least one machine tool component.

It is further imaginable that the display requirement is defined in such manner that the deviation of the current signal from the target signal is so small that the quality of the processing of a work piece is not or only slightly impaired.

In such case, a replacement or repair of the machine tool component can be planned if the machine tool stands still anyway.

If the predefined or pre-definable number of old data sets has been reached or exceeded, there is a decision aid as to whether the deviation is a phenomenon that has occurred for the first time or only once or whether it is a systemic defect of the machine tool.

It has turned out to be advantageous if the pre-definable or predefined number of old data sets includes at least ten, or at least five, or at least one. Thus, it can be distinguished whether the deviation is a one-time phenomenon or whether it is a systemic deviation.

Moreover, it is advantageous if the new data set includes at least one piece of information about the deviation of the current signal from the target signal, the component and/or the machine tool and/or that the old data set includes at least one piece of information about the deviation, the component, and/or the machine tool.

In order to facilitate an analysis of the deviation signal, it has turned out to be advantageous if an automatic and/or manual diagnosing and/or calibrating at least of the component is carried out on the basis of the deviation signal.

In principle, it is imaginable that the deviation and/or the deviation signal of only one single machine tool is displayed. In addition, it is imaginable that at least one of the at least one old data sets comprises a further machine tool deviating from the machine tool of the new data set.

It has turned out to be practical if a remote maintenance is demandable or clearable by the operating personnel. Furthermore, a remote maintenance can be carried out without being demanded by the operating personnel.

Finally, it has turned out to be advantageous if at least one of the at least one old data sets includes a further machine tool deviating from the machine tool of the new data set.

This allows an embodiment of the present to draw on different machine tools, which allows for the detection of systemic defects of the machine tool components. Thus, a deterioration of the quality of the work result is detectable in due course.

In addition, the task is solved by a machine tool that is operable according to a process, in particular including one of the process steps previously mentioned.

Finally, the task is solved by a storage unit for storing and retrieving data sets that is operable according to a process, in particular including one of the process steps previously mentioned.

The process according to the embodiments of the present invention, the machine tool according to the embodiments of the present invention, and the storage unit according to the embodiments of the present invention are advantageous in several aspects.

Deviations may be detected externally because the deviation signal is transferable as a new data set to and storable in an externally accessible storage unit separate and separable from the machine tool.

A deviation of the current signal from the target signal may be detected in due time because the deviation is displayed by means of predefined display requirements or if a certain number of stored old data sets is exceeded or reached.

Further features, details, as well as advantages of the embodiments of the present invention may be inferred from the attached patent claims, from the drawings, and the subsequent description of a preferred embodiment of the process according to the embodiments of the present invention.

FIG. 1 shows a schematic process chart of the process according to an embodiment of the present invention. In a first process step 2, a target signal 4 of a component 6 of a machine tool 8 is detected. In this context, at least one stored predefined reference number 5 is taken as a basis.

In a further step 10, a current signal 12 of the at least one component 6 of the machine tool 8 is detected. In this context, a deviation of the target signal 4 from the current signal 12 is detected and a deviation signal 14 is generated. This is transferred to a storage unit 16 and stored as a new data set 18, in which connection the storage unit 16 is externally accessible. The external access can, for instance, be made by a further storage unit 20 or a data processing unit. Moreover, a further machine tool 8 may also access the storage unit 16.

In addition, old data sets 24 are also storable and/or stored in the storage unit 16 which correspond with the new data set 18 with regard to the machine tool 8 and/or component 6.

In the further storage unit 20, in the processing unit 22, and/or in one of the machine tool 8 or a further machine tool 8, the deviation signal 14 or the new data set 18 are displayed if a display requirement 26 stored in the storage unit 16 has been satisfied. This can, for example, include a deviation of the current signal 12 from the target signal 4 of at least 10%.

Figure 2:
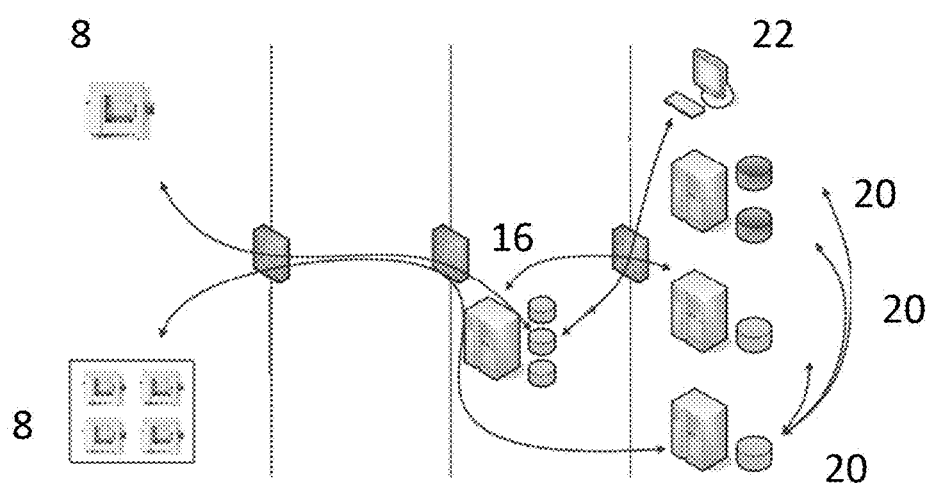
FIG. 2 shows a schematic figure of the components illustrating the process according to an embodiment of the present invention.

FIG. 2 shows a schematic figure of different constellations with regard to which the process according to the invention may be applied.

The at least one machine tool 8 can include only one single machine tool 8 or several machine tools 8. In the latter case, it is imaginable that these are operated in different locations. The process according to the embodiments of the present invention allows the machine tools 8 to determine at least the current signals 12 of the components 6 when performing a work step and process them with the corresponding target signals 4 in order to determine a deviation and to generate a deviation signal 14 on this basis.

This is transferred to the storage unit 16 where it is stored and/or it is stored in the new data set 18. By means of further storage units 20, the data processing unit 22 or a further machine tool 8 the new data set 18 or to old data sets 24 already stored in the storage unit 16 can be accessed.

In the following, the process according to the embodiments of the present invention as well as the interaction of the individual elements and components is briefly described.

When starting up the machine tool and performing a work step by the at least one component 6 of the machine tool 8, a predefined reference number 5 is taken as a basis that shows the work step. A target signal 4 is determined on this basis.

During the operation of the component 6 of the machine tool 8, a current signal 12 is detected. From the target signal 4 and the current signal 12, a deviation is determined on the basis of which a deviation signal 14 is generated. This is transferred to an externally accessible storage unit 16 and stored there as a new data set 18. In addition, old data sets 24 are also stored in the storage unit 16, which allows the system to determine whether the deviation had occurred before or whether it is a singular event.

Thus, the deviation is externally detectable. An automatic and/or manual diagnosing of the deviation may take place and an automatic or manual calibrating at least of the component 6 of the machine tool 8 may be triggered.

The features of the invention shown in the above description, in the claims, and in the drawing, may be individual, as well as in any arbitrary combination, in the realization of the invention and its different embodiments.

An embodiment of the present invention further includes retrieving an old data set stored in the storage unit corresponding to the new data set.

An embodiment of the present invention further includes a defined or definable display requirement that includes a deviation of the current signal from the target signal of at least 10% of the target signal. Additionally, an embodiment of the present invention further includes a defined or definable display requirement that includes a deviation of the current signal from the target signal of at least 5% of the target signal. Further, an embodiment of the present invention further includes a defined or definable display requirement that includes a deviation of the current signal from the target signal of at least 1% of the target signal An embodiment of the present invention further includes at least ten pre-defined or pre-definable number of old data sets. Additionally, an embodiment of the present invention further includes at least five pre-defined or pre-definable number of old data sets. Further, an embodiment of the present invention further includes at least one pre-defined or pre-definable number of old data sets.

We claim:

1. A method of monitoring at least one machine tool, the method comprising:
   determining at least one target signal of at least one component of the machine tool when performing a work step on the basis of at least one pre-definable or predefined reference number;
   continuously detecting a current signal of the at least one component of the machine tool when performing the work step using a sensor on the at least one component of the machine tool;
   continuously detecting a deviation of the target signal from the current signal;
   continuously generating a deviation signal, wherein the deviation signal comprises at least one piece of information about the component, the machine tool, and/or the deviation;
   transferring and storing the deviation signal as a new data set to an externally accessible storage unit that is separate or separable from the machine tool;
   verifying whether an old data set corresponding to the new data set is stored in the storage unit;
   allocating or storing the new data set in the old data set; and
   displaying the deviation of the target signal from the current signal if:
   a) the deviation signal and/or the new data set satisfies a defined or definable display requirement that is storable or stored in the machine tool and/or the storage unit; and
   b) a pre-defined or pre-definable number of the old data sets stored in the storage unit is reached or exceeded,
   wherein the display requirement is defined or definable in such a manner that the deviation of the current signal from the target signal is a value in which a quality of a work piece is not impaired; and
   correcting or repairing in order to correct or repair the machine tool based on the machine tool deviation signal prior to a failure of the machine tool.

2. The method according to claim 1, wherein the verification of whether there is an old data set is carried out by a further storage unit independent from the storage unit, or by a data processing unit.

3. The method according to claim 1, further comprising retrieving an old data set stored in the storage unit corresponding to the new data set, wherein the retrieving of the old data set is carried out by a further storage unit independent from the storage unit, or by a data processing unit.

4. The method according to claim 1, wherein the new data set comprises at least one piece of information about the deviation of the current signal from the target signal, the component, and/or the machine tool.

5. The method according to claim 1, wherein the old data set comprises at least one piece of information about the deviation, the component, and/or the machine tool.

6. The method according to claim 1, further comprising carrying out an automatic or manual diagnosing or calibrating of at least the component on the basis of the deviation signal.

7. The method according to claim 6, wherein the automatic or manual diagnosing or calibrating is carried out by a control unit of the machine tool or the external storage unit.

8. The method according to claim 1, wherein at least one of the old data sets comprises a further machine tool deviating from the machine tool of the new data set.

9. A method of monitoring at least one machine tool, the method comprising:
   continuously determining at least one target signal of at least one component of the machine tool when performing a work step on the basis of at least one pre-definable or predefined reference number;
   detecting a current signal of the at least one component of the machine tool when performing the work step using a sensor on the at least one component of the machine tool;
   continuously detecting a deviation of the target signal from the current signal;
   continuously generating a deviation signal, wherein the deviation signal comprises at least one piece of information about the component, the machine tool, and/or the deviation;
   transferring and storing the deviation signal as a new data set to an externally accessible storage unit that is separate from the machine tool;
   verifying whether an old data set corresponding to the new data set is stored in the storage unit;
   allocating or storing the new data set in the old data set; and
   displaying the deviation of the target signal from the current signal if:
   a) the deviation signal and/or the new data set satisfies a defined or definable display requirement that is storable or stored in the machine tool and/or the storage unit; and
   b) a pre-defined or pre-definable number of the old data sets stored in the storage unit is reached or exceeded,
   wherein the display requirement is defined or definable in such a manner that the deviation of the current signal from the target signal is a value in which a quality of a work piece is not impaired;
   monitoring the machine tool deviation signal beyond operating personnel of the machine tool; and
   correcting or repairing the machine tool based on the machine tool deviation signal prior to a failure of the machine tool.

10. The method according to claim 9, further comprising performing remote maintenance on the machine tool.

11. The method according to claim 9, further comprising displaying the deviation signal when the deviation of the current signal from the target signal is at least 10% of the target signal.

12. The method according to claim 9, further comprising displaying the deviation signal when the deviation of the current signal from the target signal is at least 5% of the target signal.

13. The method according to claim 9, further comprising displaying the deviation signal when the deviation of the current signal from the target signal is at least 1% of the target signal.

14. A method of monitoring at least one machine tool, the method comprising:
- determining at least one target signal of at least one component of the machine tool when performing a work step on the basis of at least one pre-definable or predefined reference number;
- continuously detecting a current signal of the at least one component of the machine tool when performing the work step using a sensor on the at least one component of the machine tool;
- continuously detecting a deviation of the target signal from the current signal;
- continuously generating a deviation signal, wherein the deviation signal comprises at least one piece of information about the component, the machine tool, and/or the deviation;
- transferring and storing the deviation signal as a new data set to an externally accessible storage unit that is separate or separable from the machine tool;
- verifying whether an old data set corresponding to the new data set is stored in the storage unit:
- allocating or storing the new data set in the old data set: and
- displaying the deviation of the target signal from the current signal if:
  a) the deviation signal and/or the new data set satisfies a defined or definable display requirement that is storable or stored in the machine tool and/or the storage unit; and
  b) a pre-defined or pre-definable number of the old data sets stored in the storage unit is reached or exceeded,
- wherein the display requirement is defined or definable in such a manner that the deviation of the current signal from the target signal is a value in which a quality of a work piece is not impaired, and
- replacing or repairing the at least one component of the machine tool based upon the deviation of the current signal from the target signal.

* * * * *